May 31, 1932.  H. C. MacDOUGALL  1,860,746
NUT SHELLING MACHINE
Filed Dec. 5, 1929   9 Sheets-Sheet 1

INVENTOR
Hugh C. MacDougall
BY
ATTORNEY

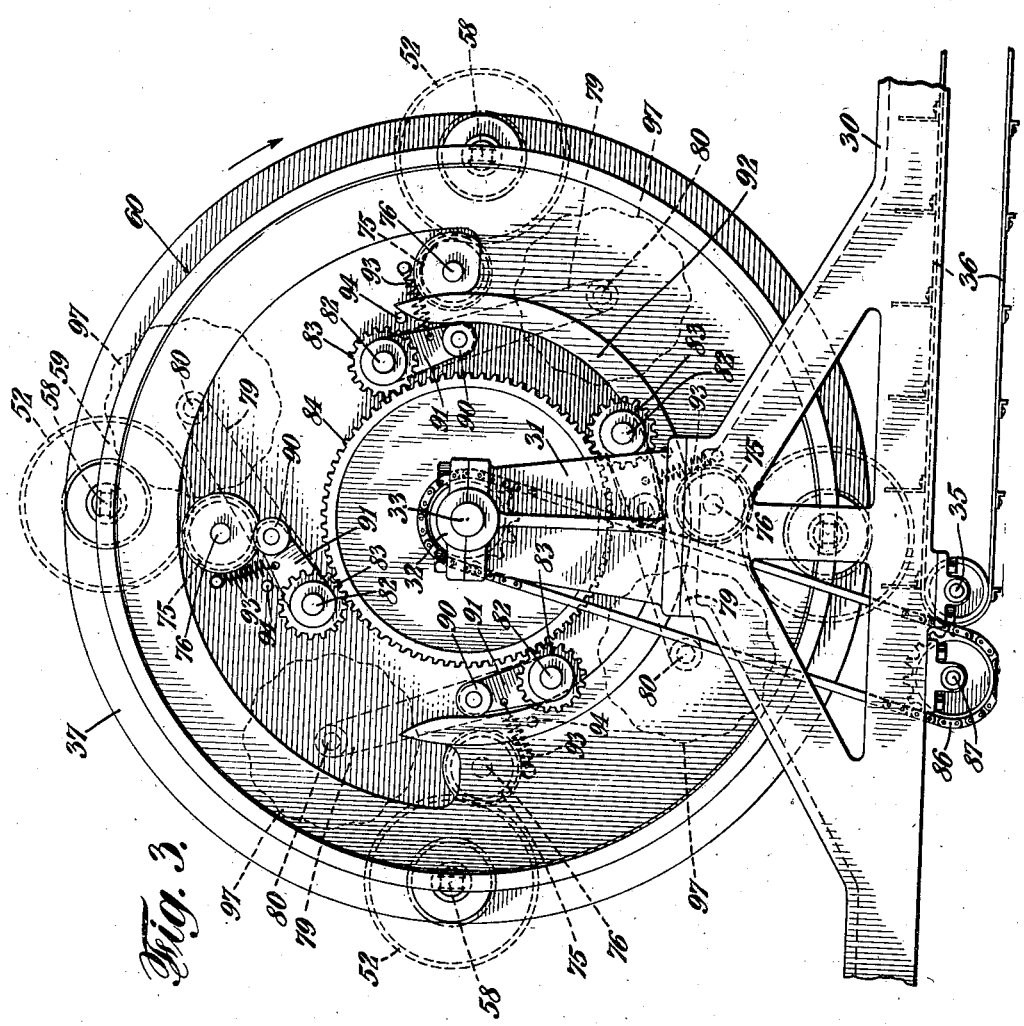

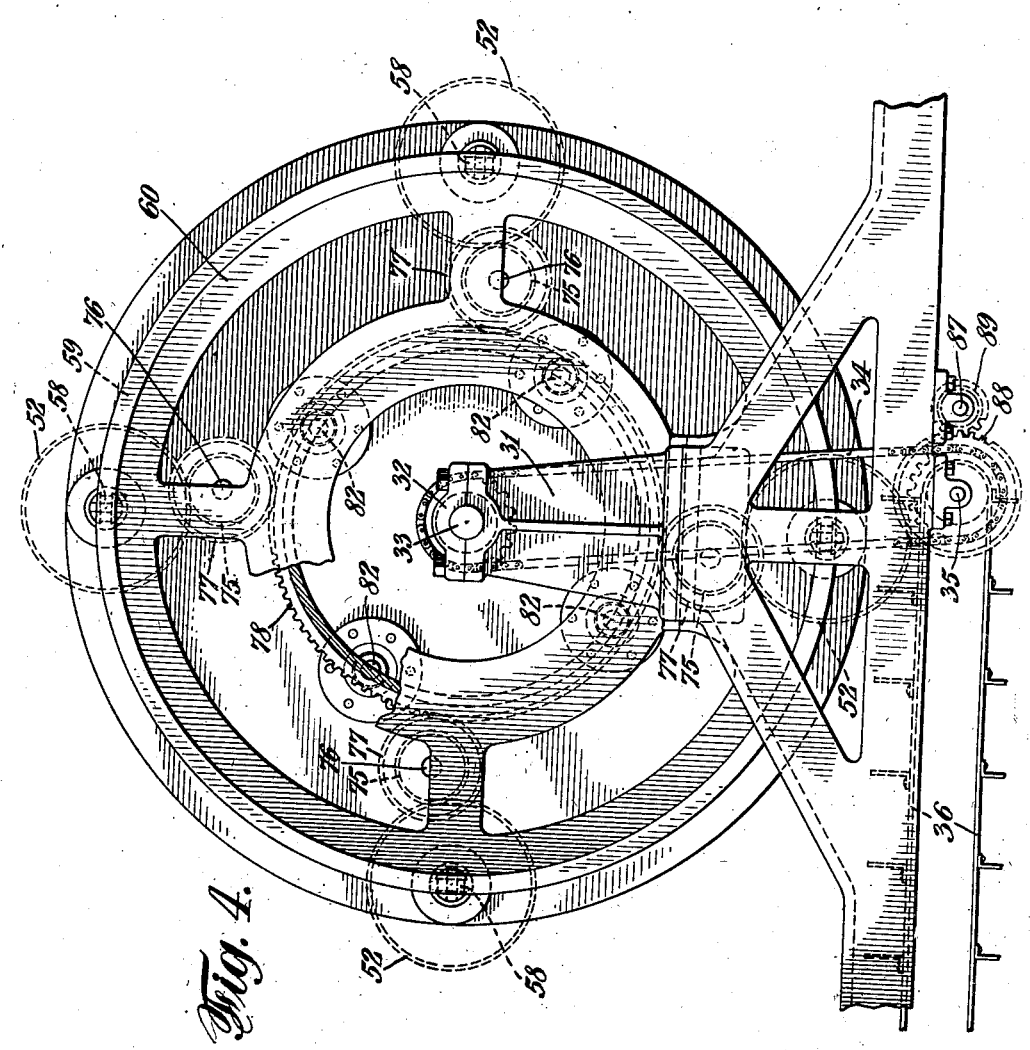

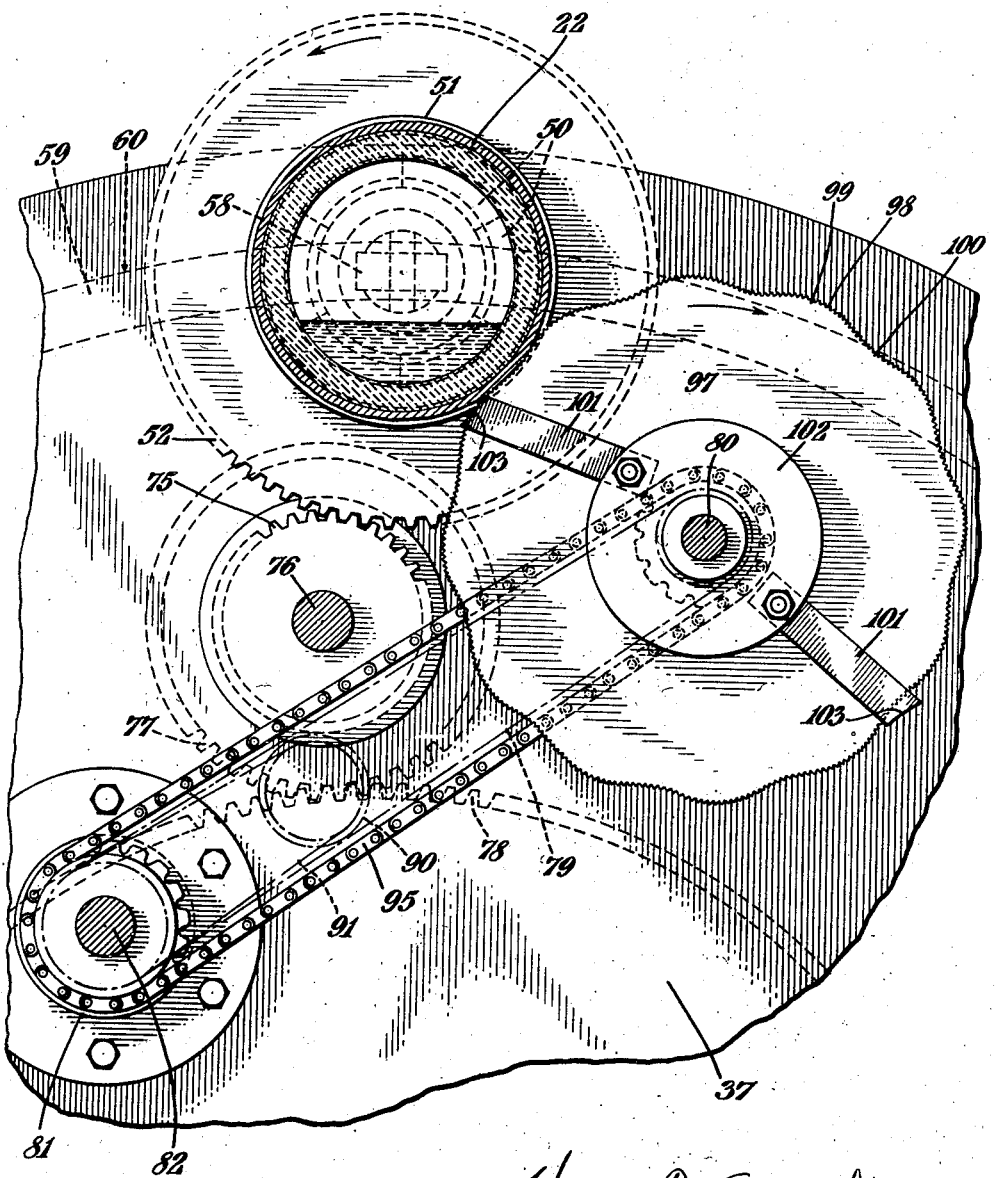

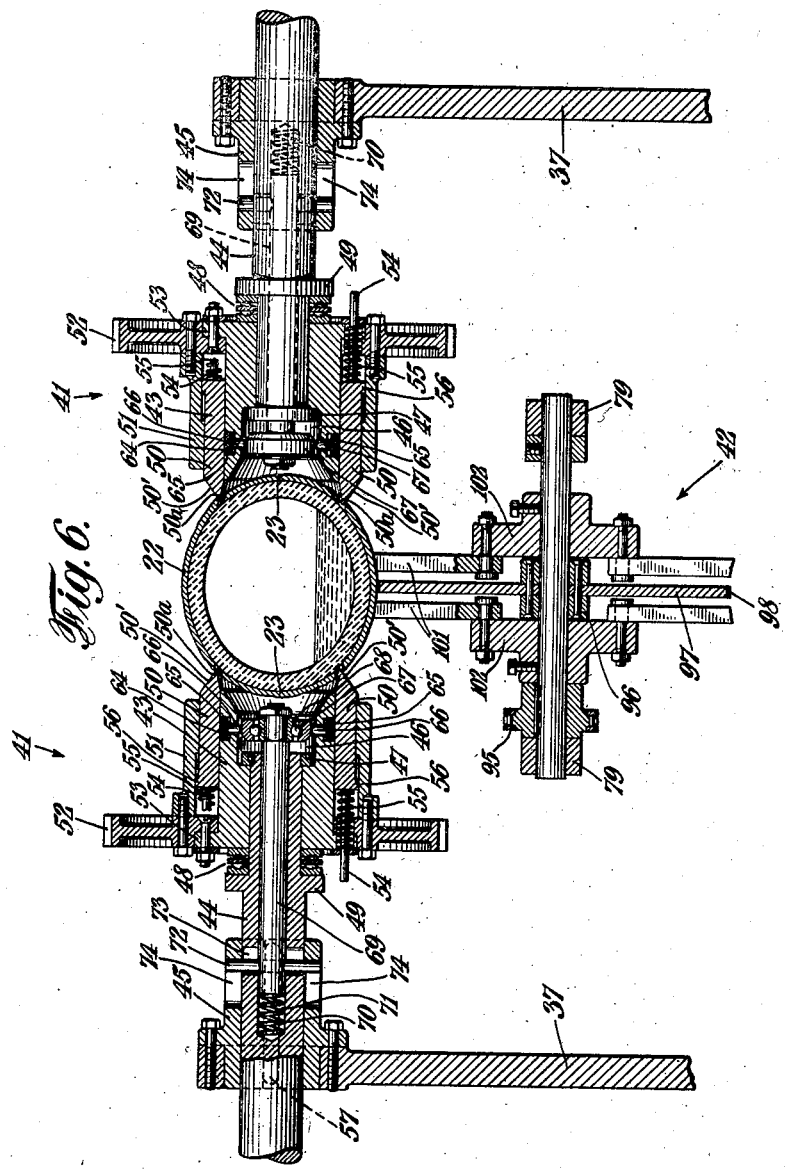

May 31, 1932.  H. C. MacDOUGALL  1,860,746
NUT SHELLING MACHINE
Filed Dec. 5, 1929   9 Sheets-Sheet 7
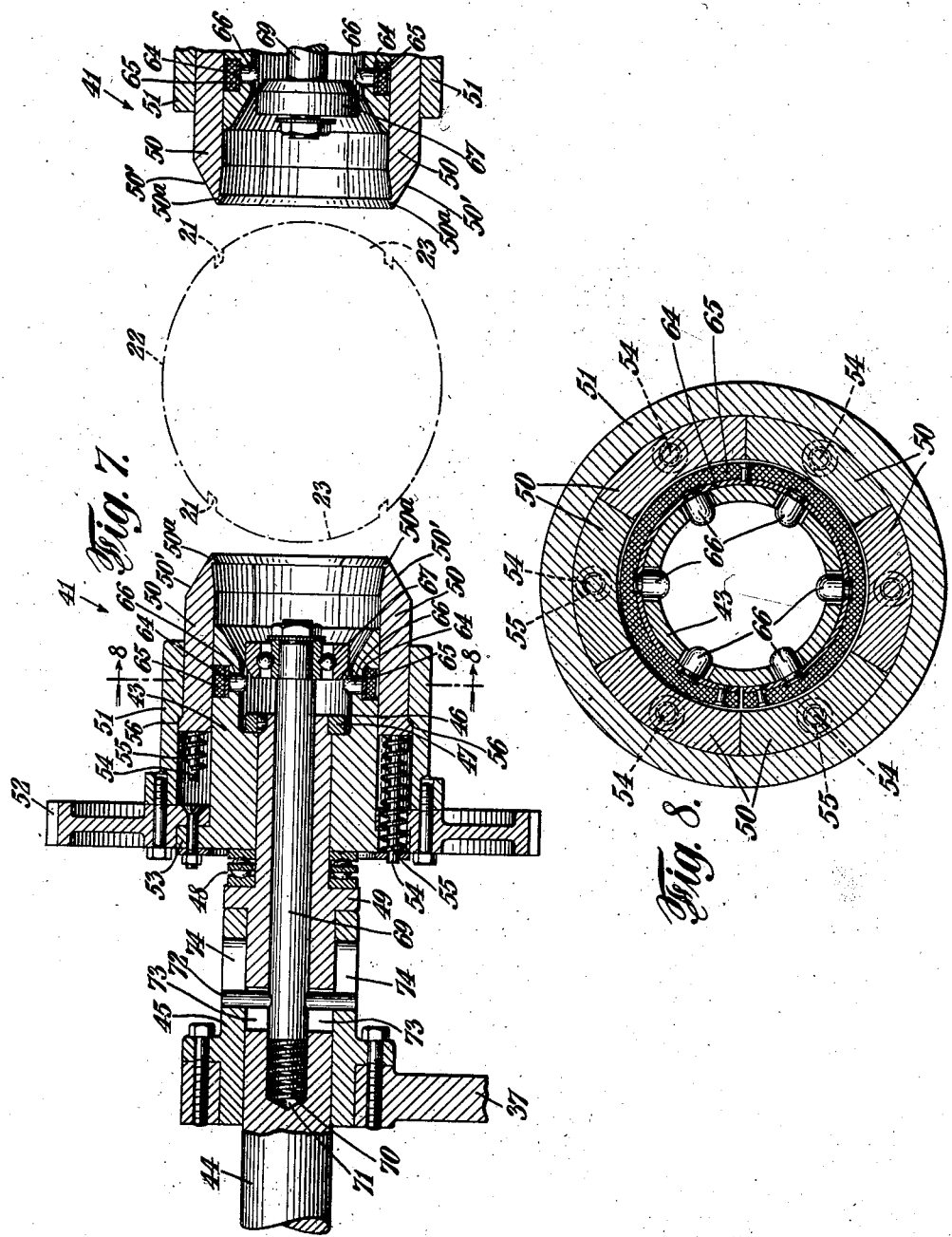

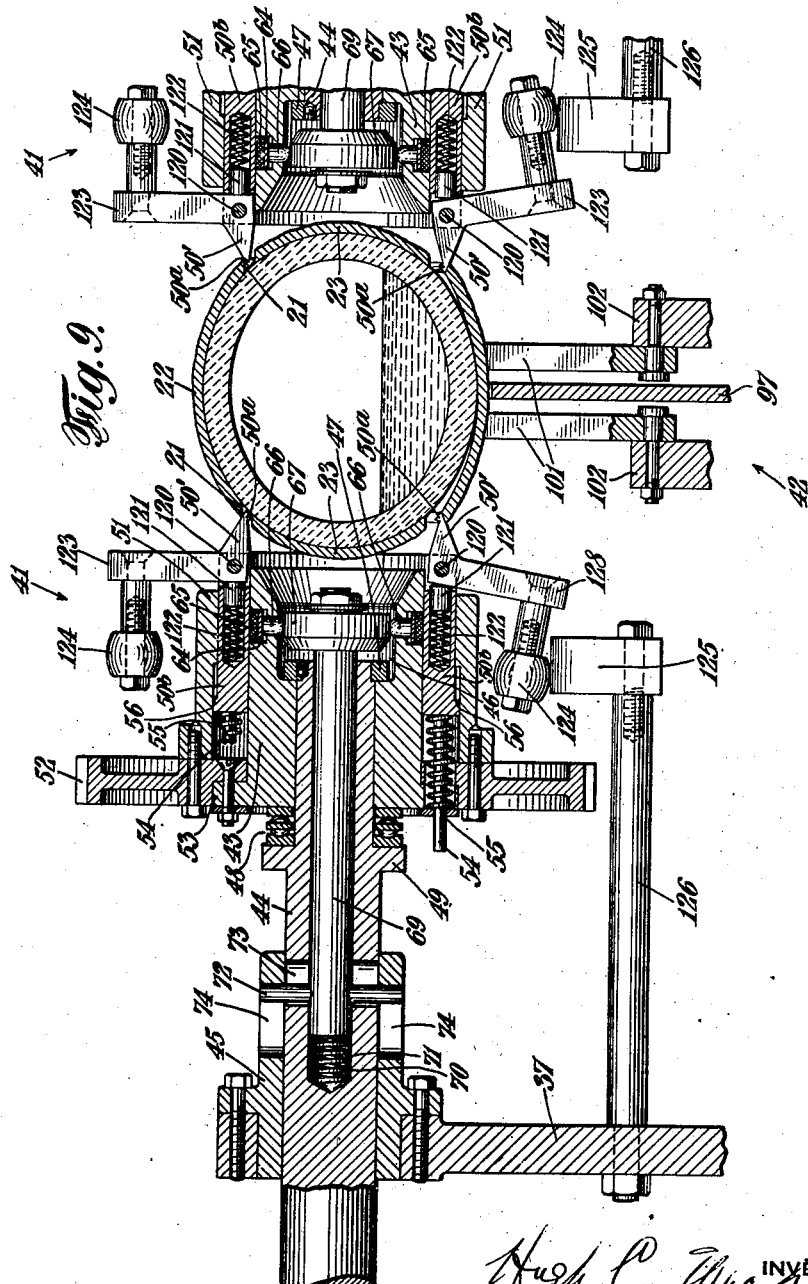

May 31, 1932.  H. C. MacDOUGALL  1,860,746
NUT SHELLING MACHINE
Filed Dec. 5, 1929  9 Sheets-Sheet 9
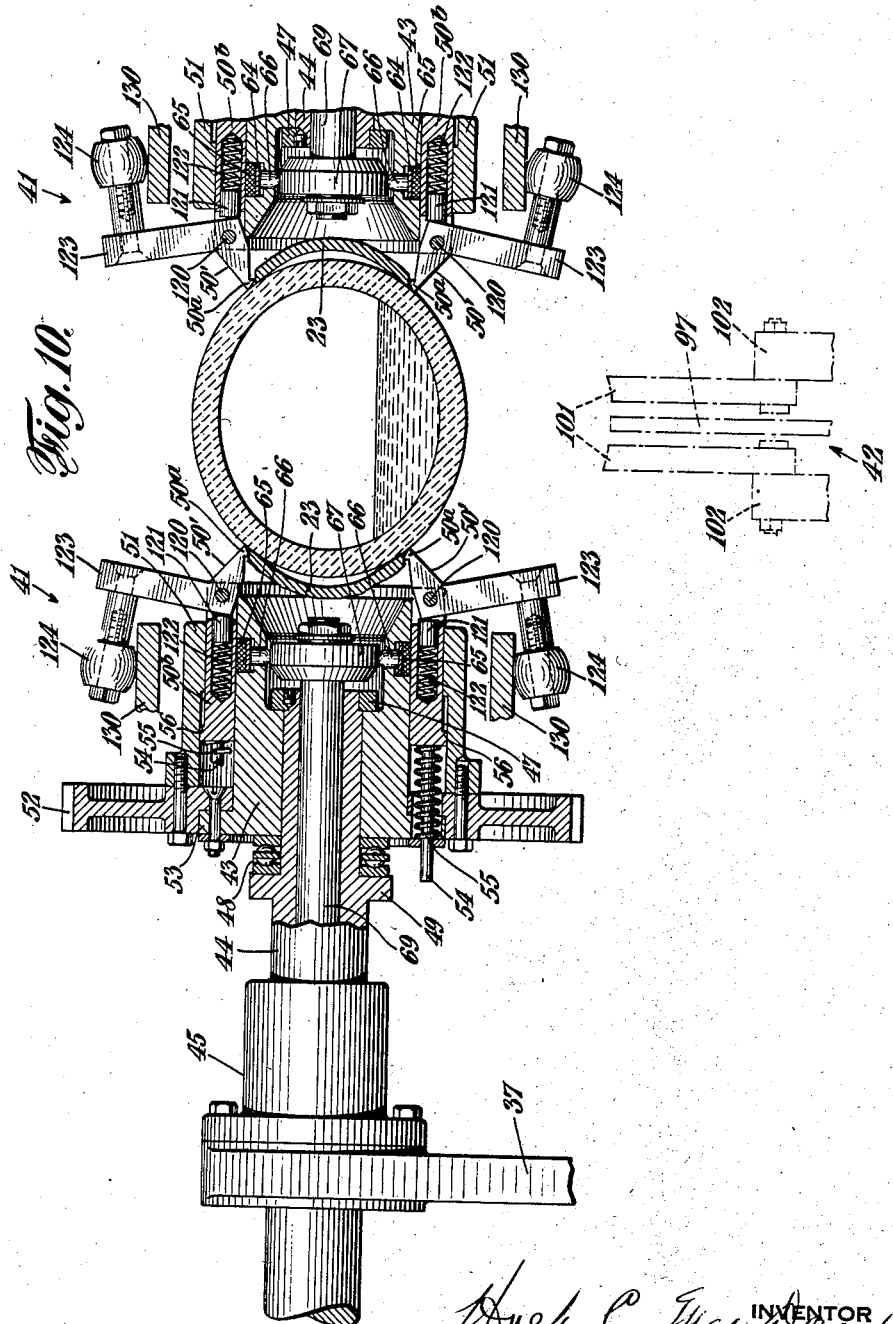

Patented May 31, 1932

1,860,746

UNITED STATES PATENT OFFICE

HUGH C. MacDOUGALL, OF WEST NEW YORK, NEW JERSEY, ASSIGNOR TO FRANKLIN BAKER COMPANY, OF NEW YORK, N. Y., A CORPORATION OF NEW JERSEY

NUT SHELLING MACHINE

Application filed December 5, 1929. Serial No. 411,711.

My invention relates to machines for removing the shells of nuts, and especially for shelling large hollow kerneled nuts, such as cocoanuts.

The principal object is to provide a machine which operates at relatively high speed and thoroughly removes the shells from a large number of nuts per unit time of operation. To this end, the machine comprises a rotary carrier having spaced chucks in which the nuts, having annular kerfs or grooves cut in the shells near the ends, are placed; gripping or wedging devices which are advanced into the shell grooves and engage the ends of the central zone or belt of the shell; and rotary, centrifugal hammering devices which are guided by contact with the shell belt, and hammer and break it while the wedge devices assist in splitting and prying the belt portion of the shell away from the kernel. The machine also includes in some cases means for removing the shell end portions or caps.

The present machine is in certain respects similar to that disclosed in my prior application Serial No. 358,461 filed April 27, 1929, and especially it is designed to operate on nuts, the shells of which are grooved by the method and mechanism disclosed in that application and then delivered automatically to the shelling mechanism proper. In distinction from the prior application, in the present case, the gripping or wedging devices are not designed to produce a bulging of the belt portion of the shell, but more particularly to grip and split and separate the belt portions from the kernel. Also in further distinction from said application, the present hammering devices include rotary cams or guides which engage the revolving shell belt and direct or regulate the action upon the belt of the centrifugal hammers which intermittently strike and crack the shell.

Before the cracking operation, the nuts are usually steamed or soaked to soften the shells and facilitate the cracking and removing operations.

The characteristics and advantages of the invention are further sufficiently explained in connection with the following detail description of the accompanying drawings, which show representative embodiments. After considering these examples, skilled persons will understand that many variations may be made without departing from the principles disclosed and I contemplate the employment of any structures that are properly within the scope of the appended claims.

In the drawings:

Fig. 3 is an elevation from the right of Fig. 3.

Fig. 4 is an elevation from the left of Fig. 2.

Fig. 5 is an enlarged fragmentary section at 5—5, Fig. 2.

Fig. 6 is a section through one of the nut supporting and shell separating devices and corresponding hammering device in the plane of their axes.

Fig. 7 is a similar view of the supporting or chuck mechanism in a position preliminary to that of Fig. 6.

Fig. 8 is a section at 8—8, Fig. 7.

Fig. 9 is a view similar to Fig. 6, but showing a modified structure.

Fig. 10 is a fragmentary section similar to Fig. 9, showing the parts in another position.

Figure 1:
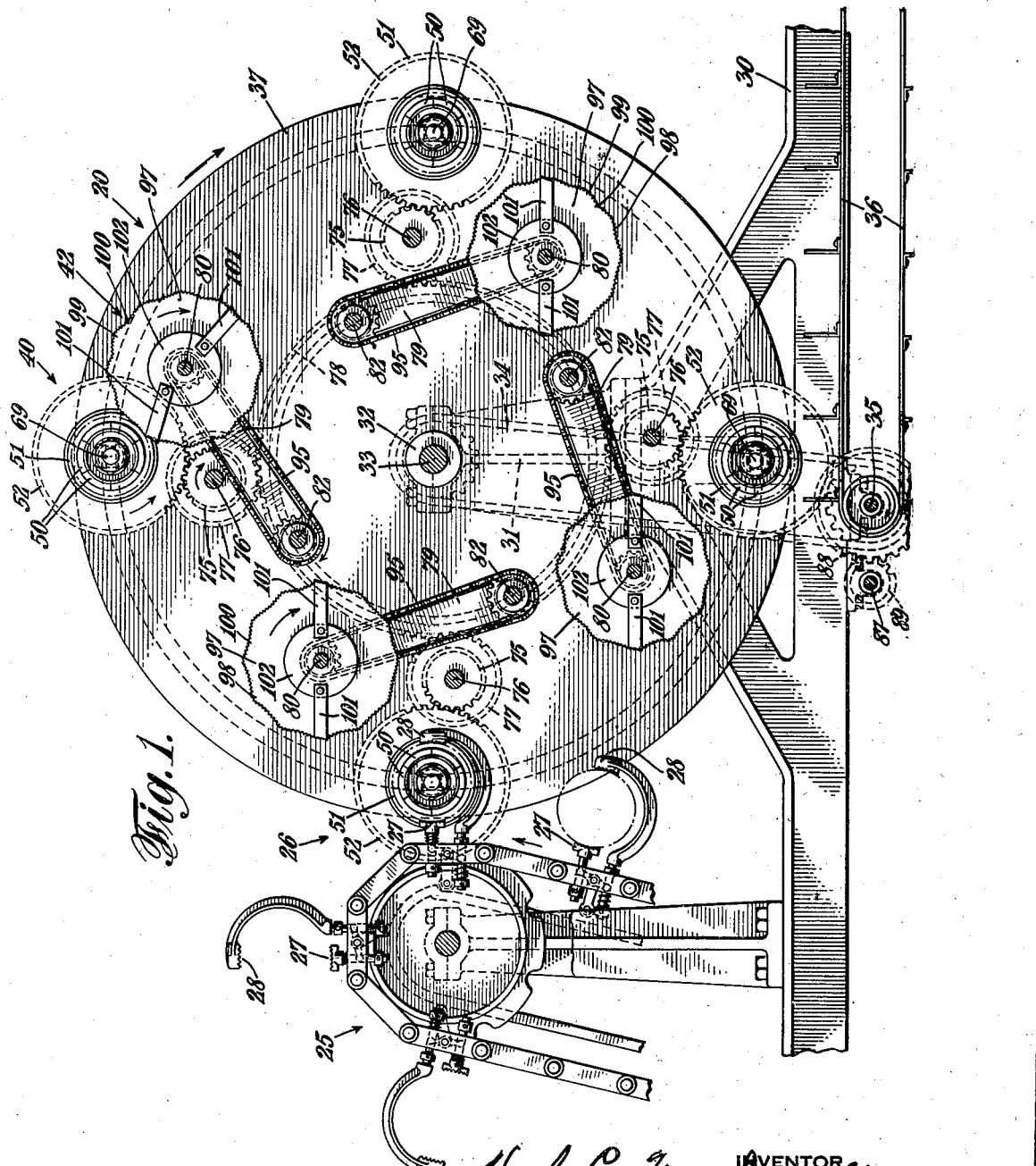
Fig. 1 is a vertical, longitudinal section of a machine embodying the invention in one form, the section plane being at 1—1, Fig. 2.

The present invention relates to the improved shell cracking and removing mechanism shown at 20 in Fig. 1 and in the other views. In accordance with the present plan of operations, the nuts such as cocoanuts, sufficiently shown in Figs. 6, 7, 9 and 10, have grooves 21 cut in their shells near the ends, by methods or mechanism disclosed in the above mentioned application. These grooves preferably extend all the way through the shell and divide it into a central zone 22 identified as the belt, and end pieces or caps 23. The grooved nuts may be placed in the shell removing mechanism in any suitable way, preferably by the conveyor 25, Fig. 1, which is a part of the grooving mechanism as disclosed in the above identified application, and in which the nuts after grooving are carried to the point of delivery to the present shelling mechanism, at 26, Fig. 1, by holding devices including inner grippers 27 and outer grippers 28. At the moment of delivery to the present mechanism, the grippers are separated to release the nut, in a manner fully explained in said application.

The shell removing mechanism 20 has a frame including side members 30 and uprights 31. Mounted in bearings 32 at the tops of the uprights is a main shaft 33. This may be driven in any convenient way, as by sprockets and a chain 34 from a shaft 35, which may be considered the main driving shaft of the present mechanism and may also serve to support and drive one end of the carry-off conveyor 36 for the shelled kernels, substantially as in the above mentioned application. Fixed on the main shaft are two circular plates 37 which support the principal parts of the shelling mechanism.

Figure 2:
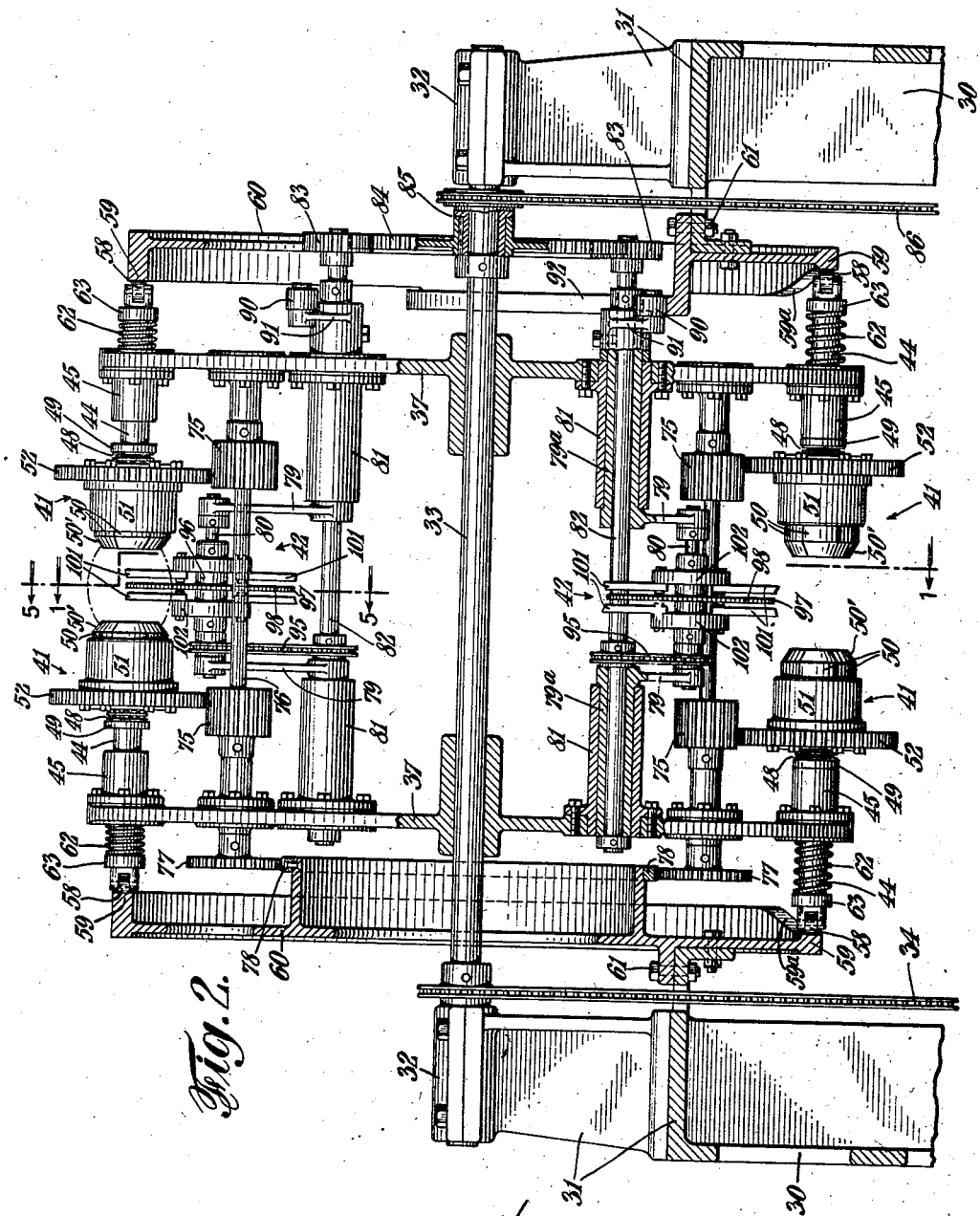
Fig. 2 is a section, enlarged, in the vertical, axial plane of the rotary carrier.

Any suitable plurality of the supporting and shelling mechanisms 40 are arranged in uniformly spaced relation on or between the plates 33. Each of these mechanisms includes two oppositely located nut supporting and shell splitting mechanisms 41, Figs. 2, 7, etc., and a hammering mechanism 42, Figs. 1, 2, 6, etc.

Each of the mechanisms 41 includes a head 43 revolubly mounted on a shaft 44, which is arranged to reciprocate in a sleeve 45 on the corresponding plate 37. At its inner end the head has a cylindrical recess 46. The head is secured against end motion on the shaft by a collar 47 on the inner end of the shaft engaging a shoulder in the head, and a ball thrust bearing 48 located between a flange 49 on the shaft and the outer end of the head. A plurality of gripper bodies 50 are mounted to reciprocate independently on the cylindrical head, in the axial direction. These bodies are part-cylindrical, and their longitudinal edges abut. They are secured in position by an outer sleeve 51 which is bolted to a gear 52, and the gear in turn is bolted to a flange 53 on the outer end of the head. The gripper bodies are provided with stems 54 projecting through holes in the flange, and springs 55 about the stems urge the bodies to move inward (toward the center of the machine or center of the nut) until stopped by shoulders 56 engaging complemental shoulders or sleeve 51, as shown in Fig. 7. Each shaft 44 is prevented from rotating in its sleeve 45 by a key or spline 57 and is moved axially at the proper times by a cam roller 58 on its outer end engaging a face cam 59 formed on a cam body 60 bolted to the adjacent frame upright at 61. The shaft is urged outward and the cam roller held on the cam by a spring 62 located between plate 37 and a flange 63 on the shaft.

To hold the gripper bodies in fixed position in relation to each other and to the head 43 at certain times, as will appear, an expansible clutch band 64 is located in an annular recess in the head and is provided with a facing 65 of friction material to engage the inner faces of the gripping heads. The band has rounded studs 66 projecting through holes in the head and acted on to expand the clutch band by a cone ring 67 arranged as the outer ring of a ball bearing 68 on the inner end of an operating rod 69 which reciprocates in a bore in the inward part of shaft 44. This rod is urged inward in relation to the shaft by a spring 70 located in socket 71 and its motion is further controlled by a cross pin 72 passing through a slot 73 in the shaft in another slot 74 in sleeve 45.

The gripper bodies 50 have at their inward ends outer beveled faces 50', and may in some cases also have the inside portions of the inward ends arranged as bevelled hook formations 50ª, for reasons which will appear.

The heads 50 with their gripper bodies are rotated by engagement of the gears 52 with pinions 75 on shaft 76 revolubly mounted in the plates 37. Each of the pinion shafts has at one outer end a gear 77 engaging a stationary gear 78 on one of the fixed cam bodies 60, so that as the plates 37 are continuously revolved along the shaft 33, the gripper bodies and grippers of all the sets of grippers are continuously roated in a relatively reverse direction.

Each of the hammering mechanisms includes an oscillating frame comprising arms 79 which extend from the inner ends of sleeves 79ª, and a shaft 80 revolubly mounted in bearings at the ends of the arms. The sleeves 79ª are arranged to oscillate in other fixed sleeves 81 secured to plates 37. A revoluble shaft 82 passes through the two sleeves of each hammering mechanism and is rapidly rotated by a pinion 83 on one of its ends, engaging a gear 84 which is carried by a hub 85 revolubly mounted on a main shaft 33 and driven by sprockets and a chain 86 from a countershaft 87; this counter-shaft is driven from shaft 35 by a gear 88 and pinion 89. The swinging frame carrying shaft 80 is oscillated at the proper times by a cam roller 90 mounted on a short arm 91 secured to the outer end of one of the sleeves 79ª and engaging an approximately semi-circular cam 92 formed as a part of one of the fixed cam bodies 60 above referred to. The cam rollers are held in engagement with the cam by springs 93 and the outward movement of the swinging frames is limited, when the cam rollers are not in engagement with the cam, by a stop 94 provided for the arm 91 of each frame. The shaft 80 carried by the arms of each swinging frame is driven by sprockets and a chain 95 from the corresponding shaft 82.

Revolubly mounted on shaft 80 at its center is a hub 96 carrying a cam plate 97, the periphery of which has teeth or serrations 98 to engage the equatorial zone of the nut shell belt. The cam periphery is also made in wave or sinuous form, including humps 99 and hollows 100. The cam plate is driven only by engagement of its periphery with the nut shell, and controls the oscillating movement of the frame and the hammer mechanism (to be described) with relation to the nut.

The centrifugally operated hammers 101 are mounted on disks 102, fixed on shaft 80 at either side of the cam plate. Preferably there are two or more hammers—specifically two, as shown, connected to each of the supports of disks 102 at radially opposite points thereof. Each hammer is a substantially rectangular piece of metal of substantial width and its end which constitutes the active striking member to engage the nut is bevelled or slantingly rounded as at 103, Fig. 5.

In operation, as each nut gripping mechanism reaches the nut receiving point 26, Fig. 1, the individual gripping mechanisms (including the heads 43 and gripper bodies 50 thereon) are retracted axially or away from the center plane of the machine and center of the nut to be located between the gripping members. The conveyor 25 moving in the direction of the arrow, Fig. 1, positions the grooved nut at 26 and as grippers 27, 28 are moved divergently to free the nut, the gripper heads 43 and gripper bodies of the shelling mechanism are moved convergently by reason of the cam rollers 58 riding upon rise portions of cams 59, one of these rise or angular portions of the cam being shown at 59ª in Fig. 2, these being the portions of the cam which permit retraction of the gripper heads as later referred to. The gripping ends of the gripper bodies 50 enter and engage in the nut shell grooves 21. The grippers are at this time, as shown in Fig. 7, in inward or extended position in relation to the heads, being so held by springs 55, and as the heads continue to move inward, each gripper assumes a position in relation to the others and to the head which depends on the contour of the nut groove. This groove may be irregular due to the irregular shape of the nut. The independent and resilient mounting of the gripper bodies also allows for different axial dimensions of nuts. The gripper ends being thus firmly seated in the grooves, as the heads continue to move inward, the inward movement of the clutch cone ring 67 is checked by engagement of cross-pin 72 in its rod 69 with the inner end of slot 74 in fixed sleeve 45, and the cone ring acts on studs 66 to expand the clutch and lock the gripper heads in position in relation to each other and to their supporting head. The gripper parts are then in the position of Fig. 6, and the nut is rotated by the rotation of the heads produced in the manner above described.

At the time that the grippers approach the nut, receiving position, the corresponding swinging frame, that is the outer ends of arms carrying one of the hammering mechanisms, are retracted inward by location of their cam roll 90 on cam 92; and just after the nut is properly gripped, the roll passes away from the cam (at the left of Fig. 3) and spring 93 moves the frame to active position with the periphery of cam plate 97 engaging the equatorial zone of the nut shell belt, as shown in Figs. 5 and 6. The hammer disks and hammer continuously and rapidly rotate in the direction of the arrow, Fig. 5, while the cam plate is rotated slower, under control of the rotation of the nut with which it engages. At the same time, the swinging frame is oscillated by reason of the sinuous contour of cam plate 97. The hammers under centrifugal force naturally assume radial positions, as shown toward the left in Fig. 5, and as they approach the nut their ends strike it, tending to have an abrupt and heavy, or relatively light contact with the shell, depending on the position of the hammer in relation to the cam plate 97 at the time of striking. Thus, if at the time a hammer is in striking position as shown in Fig. 5, the nut is in engagement with a hollow 100 of the cam plate, the hammer will have a relatively abrupt or heavy impact with the nut shell, while if a hill portion 99 of the cam is in engagement with the nut, the hammer will strike only lightly. This vigorous hammering of the shell continues during approximately one-half revolution of the supporting plates and gripping mechanisms, and thereupon is discontinued by re-engagement of the cam roll with cam 92, retracting the frame and removing the cam and hammers from active relation to the nut.

The hammering cracks and breaks the central zone or belt of the shell away from the kernal and disruption and removal of this shell portion is facilitated by pressure of the slant faces 50' of the grippers.

The inner bevelled or hooked end formations 50ª of the grippers also engage the peripheries of the end caps 23 and remove or tend to remove these caps from the kernel.

After the described hammering action and retraction of the hammering mechanism, as the grippers and nut approach a lowermost position, the gripper heads and shafts 44 are retracted by springs 62 as the cam rolls 58 reach the lower slant cam portions 59ª. As the shafts are retracted, springs 70 tend to force the clutch cone ring rods 69 relatively inward and at the end of the retracting movement the cross pins 72 strike the outer ends of sleeves 74 and positively move the clutch cones away from the studs 66, freeing the gripper bodies, which are returned to normal, relatively inward positions, as shown in Fig. 7, by the action of springs 55.

Figs. 9 and 10 show a modification in which the grippers 50' are fulcrumed at 50$^b$, and held in normal position by plungers 121 and springs 122. These plungers and springs also tend to return grippers 50' to normal position after each operation of either breaking of the center shell or the end caps. The radial arms 123 of the gripper levers carry cam rollers 124. Cams 125 are supported by rods 126 from plates 33, so that at one point, in the rotation of each gripper head, the cam rollers strike the cams and tend to force the grippers 51 outward to assist in disrupting and freeing the shell belt from the nut, as clearly shown in Fig. 9. Other cams such as 130 in Fig. 10 may be provided to act on the cam rollers 124 and move the grippers 51 convergently to grip the peripheries of the shell caps and bend them convexly or crack and remove them by gripping action of the hook formations 52. Either or both of these modifications may be incorporated in the general mechanism illustrated in the other figures.

From the foregoing, it will be seen that the present invention provides an arrangement of increased efficiency over any arrangements heretofore used for removing the shells of nuts. In prior structures making use of straight blow hammers, there never has been any satisfactory means for checking the force of the blow after the shell has been cracked or a small piece broken out. On the average nut, the use of straight blow hammers usually resulted in the breaking of about fifty per cent of the nut kernels while in the remainder, the shells would be slightly cracked or still intact.

The action of the centrifugal hammers described in detail hereinbefore is similar to the action resulting from striking a glancing blow to the outside of the shell. The blow is delivered on the belt portion of the shell directly on the center line with the poles of the nut. Due to the rotation of the hammers, the force of the blow is lost after passing the center line. The fact that the nut rotates in the opposite direction to the hammers has an advantage in that the hammers in effect force the shell down as well as draw the same away from the kernel leaving no direct force on the kernel. The vibration caused by the high speed of the machine also possesses an advantage in that it helps to loosen the end caps.

Since the hammers project only a slight distance beyond the gaging disc, there is no damage to the meat or kernel after the shell is broken off. Since the hammers are influenced by centrifugal force, they must hit against something hard in order to deliver the full force of the blow. When they come into direct contact with the kernel, they act as a high speed cutter, cutting out a groove slightly deeper than the brown skin.

Another inherent advantage in the present structure resides in the fact that free shelling and hard shelling nuts may be efficiently operated upon by the same machine by merely adjusting the springs which control the gaging disc. For hard shelling nuts, a strong spring tension is required while a light spring tension is all that is necessary for free shelling nuts since this slight tension allows a slight rebound and lessens the force of the blow.

I claim:

1. Nut shell cracking and removing mechanism comprising convergently movable and revoluble nut shell grippers, means for revolving and convergently moving the grippers, and rotary centrifugal hammering means arranged to hammer and crack a nut shell held by the grippers.

2. Nut shell cracking and removing mechanism comprising convergently movable and revoluble nut shell grippers, means for revolving and convergently moving the grippers, rotary hammering means, and means contacting with a nut shell held by the grippers to control the hammering means in its operation upon the shell.

3. Nut shell cracking and removing mechanism comprising convergently movable and revoluble nut shell grippers, means for revolving and convergently moving the grippers, rotary centrifugal hammering means arranged for movement toward and from a nut shell held by the grippers, and rotary means in contact with the shell to control the operative relation of the hammering means to the shell.

4. Nut shell cracking and removing mechanism comprising convergently movable and revoluble nut shell grippers, means for revolving and convergently moving the grippers, rotary centrifugal hammering means arranged for movement toward and from a nut shell held by the grippers, and rotary means in contact with the shell to control the operative relation of the hammering means to the shell, said rotary means including a plate of sinuous outline to cause the hammering means to approach and recede from the shell repeatedly in each cycle.

5. Nut shell cracking and removing mechanism comprising convergently movable and revoluble nut shell grippers, means for revolving and convergently moving the grippers, rotary centrifugal hammering means arranged for movement toward and from a nut shell held by the grippers, and rotary means in contact with the shell to control the operative relation of the hammering means to the shell, said rotary means consisting of a cam plate having a sinuous serrated periphery.

6. Nut shell cracking and removing mechanism comprising convergently movable and revoluble nut shell grippers, means for revolving and convergently moving the grippers, and rotary centrifugal hammering means arranged to hammer and crack a nut shell held by the grippers, said hammering means comprising a rotor and hammers pivotally mounted thereon.

7. Nut shell cracking and removing mechanism comprising convergently movable and revoluble nut shell grippers, means for revolving and convergently moving the grippers, and rotary centrifugal hammering means arranged to hammer and crack a nut shell held by the grippers, said hammering means comprising a rotor and hammers pivotally mounted thereon, and having angularly disposed striking ends.

8. Nut shell cracking and removing mechanism comprising convergently movable and revoluble nut shell grippers, means for revolving and convergently moving the grippers, rotary centrifugal hammering means arranged for movement toward and from a nut shell held by the grippers, and rotary means in contact with the shell to control the operative relation of the hammering means to the shell, said hammering means comprising a rotor and hammers pivotally mounted thereon.

9. Nut shell cracking and removing mechanism comprising convergently movable and revoluble nut shell grippers, means for revolving and convergently moving the grippers, rotary centrifugal hammering means arranged for movement toward and from a nut shell held by the grippers, and rotary means in contact with the shell to control the operative relation of the hammering means to the shell, said hammering means comprising a rotor and hammers pivotally mounted thereon, and having angularly disposed striking ends.

10. Nut shell cracking and removing mechanism comprising convergently movable and revoluble nut shell grippers, means for revolving and convergently moving the grippers, and rotary centrifugal hammering means arranged to hammer and crack a nut shell held by the grippers, said hammering means comprising a plurality of rotors and pivotally mounted and centrifugally actuated hammers thereon.

11. Nut shell cracking and removing mechanism comprising convergently movable and revoluble nut shell grippers, means for revolving and convergently moving the grippers, rotary centrifugal hammering means arranged for movement toward and from a nut shell held by the grippers, and rotary means in contact with the shell to control the operative relation of the hammering means to the shell, said hammering means comprising a plurality of rotors and pivotally mounted and centrifugally actuated hammers thereon.

12. In a mechanism of the class described, a plurality of nut shell supporting mechanisms, each of which consists of opposite units, and each unit comprising a reciprocable head and a plurality of grippers mounted for independent co-axial reciprocation thereon, the grippers having at their ends, nut shell groove engaging formations.

13. In a mechanism of the class described, a plurality of nut shell supporting mechanisms, each of which consists of opposite units, and each unit comprising a reciprocable head and a plurality of grippers mounted for independent co-axial reciprocation thereon, the grippers having their inward ends formed with outward bevelled faces.

14. In a mechanism of the class described, a plurality of nut shell supporting mechanisms, each of which consists of opposite units, each unit comprising a reciprocable head and a plurality of grippers mounted for independent co-axial reciprocation thereon, the grippers having their inward ends formed with outward bevelled faces and inwardly directed hooked members adapted to engage the periphery of a shell end cap.

15. In a mechanism of the class described, a plurality of nut shell supporting mechanisms, each of which consists of opposite units, and each unit comprising a reciprocable head and a plurality of grippers mounted for independent co-axial reciprocation thereon, the grippers having at their ends, nut shell groove engaging formations and means for advancing and retracting the heads.

16. In a mechanism of the class described, a plurality of nut shell supporting mechanisms, each of which consists of opposite units, and each unit comprising a reciprocable head and a plurality of grippers mounted for independent co-axial reciprocation thereon, the grippers having at their ends, nut shell groove engaging formations and means acting between the head and grippers and urging the latter to extended relatively inward position.

17. In a mechanism of the class described, a plurality of nut shell supporting mechanisms, each of which consists of opposite units, and each unit comprising a reciprocable head and a plurality of grippers mounted for independent co-axial reciprocation thereon, the grippers having at their ends, nut shell groove engaging formations and means acting between the head and grippers and urging the latter to extended relatively inward position, clutch means on the head, and means for actuating the clutch means to secure the grippers in fixed relation to the head and to each other.

18. In a mechanism of the class described, a plurality of nut shell supporting mechanisms, each of which consists of opposite units, and each unit comprising a reciprocable head and a plurality of grippers mounted for independent co-axial reciprocation thereon, the grippers having at their ends, nut shell groove engaging formations and means acting between the head and grippers and urging the latter to extended relatively inward position, clutch means on the head, and means for actuating the clutch means to secure the grippers in fixed relation to the head and to each other and relatively fixed means for operating the clutch means.

19. In a mechanism of the class described, a plurality of nut shell supporting mechanisms, each of which consists of opposite units, and each unit comprising a reciprocable head and a plurality of grippers mounted for independent co-axial reciprocation thereon, the grippers having at their ends, nut shell groove engaging formations, and a rotary carrier on which a plurality of said supporting and gripping mechanisms are arranged in circularly spaced relation.

20. In a mechanism of the class described, a plurality of nut shell supporting mechanisms, each of which consists of opposite units, and each unit comprising a reciprocable head and a plurality of grippers thereon, and continuously rotating centrifugal hammering mechanism adjacent the supporting units and arranged to act on the central zone of a nut shell held thereby.

21. In a mechanism of the class described, a plurality of nut shell supporting mechanisms, each of which consists of opposite units, and each unit comprising a reciprocable head and a plurality of grippers thereon, and centrifugal hammering mechanism adjacent the supporting units and arranged to act on the central zone of a nut shell held thereby, the hammering mechanism including a swinging frame and means for moving it to and from operative relation to the nut shell.

22. In a mechanism of the class described, a plurality of nut shell supporting mechanisms, each of which consists of opposite units, and each unit comprising a reciprocable head and a plurality of grippers thereon, and centrifugal hammering mechanism adjacent the supporting units and arranged to act on the central zone of a nut shell held thereby, the hammering mechanism including a swinging frame and means for moving it to and from operative relation to the nut shell, and on the frame a rotary shaft, hammer supports on the shaft, centrifugal hammer bars pivotally mounted on the supports, and a guide member revolubly mounted on the shaft and arranged for engagement with the nut shell.

23. In a mechanism of the class described, a plurality of nut shell supporting mechanisms, each of which consists of opposite units, and each unit comprising a reciprocable head and a plurality of grippers thereon, and centrifugal hammering mechanism adjacent the supporting units and arranged to act on the central zone of a nut shell held thereby, the hammering mechanism including a swinging frame and means for moving it to and from operative relation to the nut shell, and on the frame a rotary shaft, hammer supports on the shaft, centrifugal hammer bars pivotally mounted on the supports, and a guide member revolubly mounted on the shaft and arranged for engagement with the nut shell, said member having a sinuous periphery.

24. In a mechanism of the class described, a plurality of nut shell supporting mechanisms, each of which consists of opposite units, and each unit comprising a reciprocable head and a plurality of grippers thereon, and centrifugal hammering mechanism adjacent the supporting units and arranged to act on the central zone of a nut shell held thereby, the hammering mechanism including a swinging frame and means for moving it to and from operative relation to the nut shell, and on the frame a rotary shaft, hammer supports on the shaft, centrifugal hammer bars pivotally mounted on the supports, and a guide member revolubly mounted on the shaft and arranged for engagement with the nut shell, said member having a sinuous, serrated periphery.

25. In a mechanism of the class described, a plurality of nut shell supporting mechanisms, each of which consists of opposite units, and each unit comprising a reciprocable head and a plurality of grippers thereon, and centrifugal hammering mechanism adjacent the supporting units and arranged to act on the central zone of a nut shell held thereby, the hammering mechanism including a swinging frame and relatively stationary cam means for advancing and retracting the frame in relation to the nut.

26. In a mechanism of the class described, a plurality of nut shell supporting mechanisms, each of which consists of opposite units, and each unit comprising a reciprocable head and a plurality of grippers thereon, and rotating centrifugal hammering mechanism adjacent the supporting units and arranged to act on the central zone of a nut shell held thereby, and a rotary carrier on which a plurality of said supporting and hammering mechanisms are arranged in circularly spaced relation.

27. In a mechanism of the class described, a plurality of nut shell supporting mechanisms, each of which consists of opposite units, and each unit comprising a reciprocable head and a plurality of grippers thereon, and centrifugal hammering mechanism adjacent the supporting units and arranged to act on the central zone of the nut shell held thereby, the hammering mechanism including a swinging frame and means for moving it to and from operative relation to the nut shell, and a rotary carrier on which a plurality of said supporting and hammering mechanisms are arranged in circularly spaced relation.

In testimony whereof I affix my signature.

HUGH C. MacDOUGALL.